United States Patent [19]

Verkler

[11] Patent Number: 4,693,611
[45] Date of Patent: Sep. 15, 1987

[54] FROZEN DESSERT MIXER

[75] Inventor: Charles E. Verkler, Peoria, Ill.

[73] Assignee: International Food Equipment Inc., Peoria, Ill.

[21] Appl. No.: 760,121

[22] Filed: Jul. 29, 1985

[63] Related U.S. Application Date

Continuation of Ser. No. 569,475, Jan. 9, 1984, Pat. No. 4,548,509.

[51] Int. Cl.⁴ .............................................. A23G 9/02
[52] U.S. Cl. .................................. 366/195; 222/413; 366/185; 366/196; 366/206; 366/318; 425/206
[58] Field of Search ............... 366/203, 197, 279, 318, 366/206, 247, 323, 194–196, 185, 189, ; 99/348, 452, 494, 460, 516, 517, 518; 222/413; 425/200, 206

[56] References Cited

U.S. PATENT DOCUMENTS 1,928,950  10/1933  O'Neill ................................ 366/185
2,626,133   1/1953  Reed .................................... 366/212

Primary Examiner—Robert W. Jenkins
Attorney, Agent, or Firm—Donald E. Egan

[57] ABSTRACT

The present invention concerns an ice cream machine for home use. The ice cream machine of the invention having a mixing auger and a mixing cone uses a unique drive system to vertically drive the cone to engage the auger and mix the products contained within the cone. An arc gear, pinion gear and a rack gear are provided in the drive train of the invention and are intermeshed with each other and interconnected with a manually operable lever arm to accomplish the desired vertical drive of the mixing cone. This configuration allows increased leverage and efficiency in the vertical drive movement. Also provided herein are various size reduction and easy cleaning features. Finally the unique gear drive train allows for a steady extrusion of a deliciously mixed, flavored ice cream or ice milk product.

6 Claims, 14 Drawing Figures

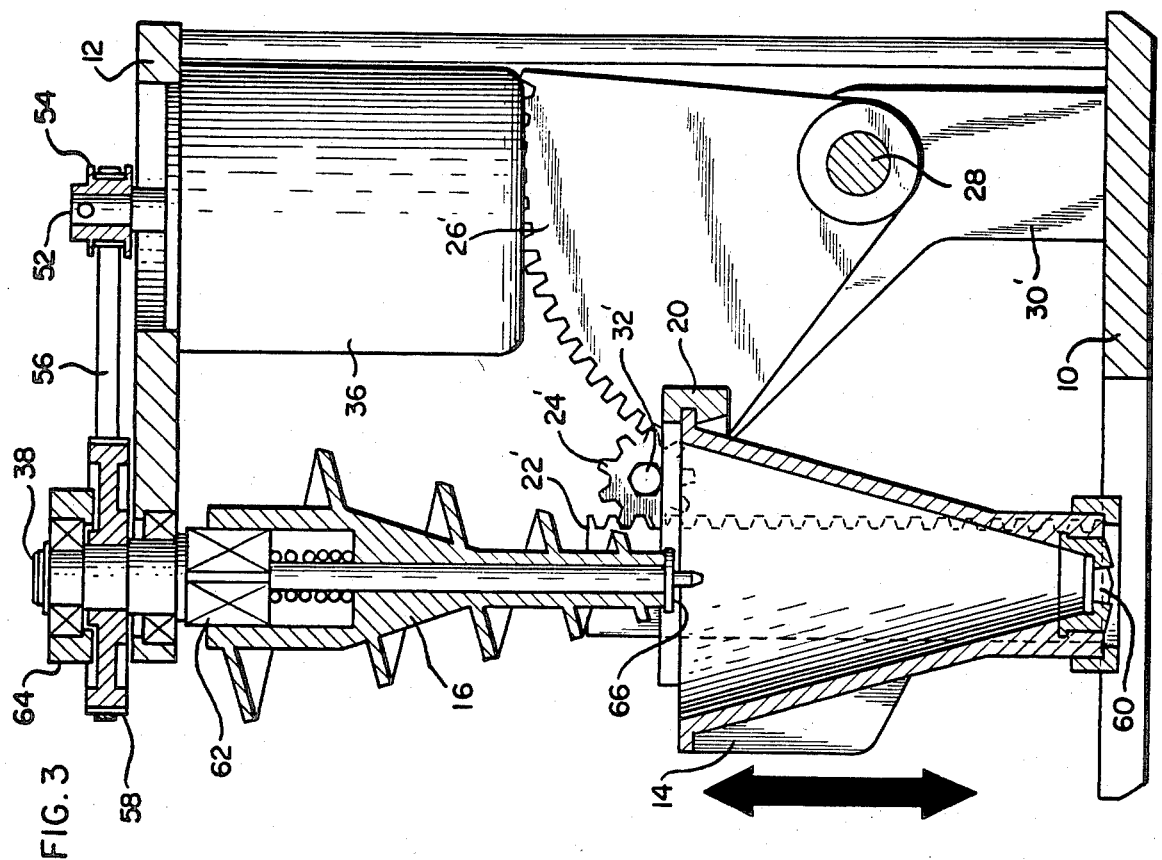
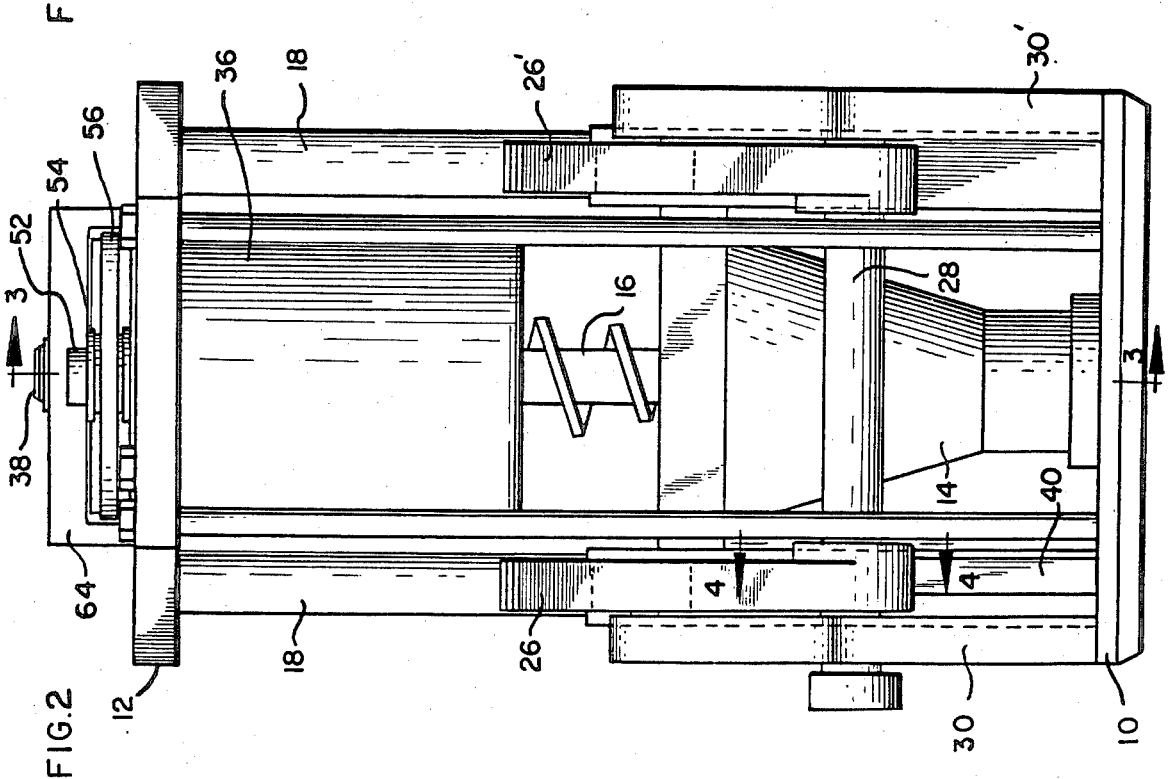

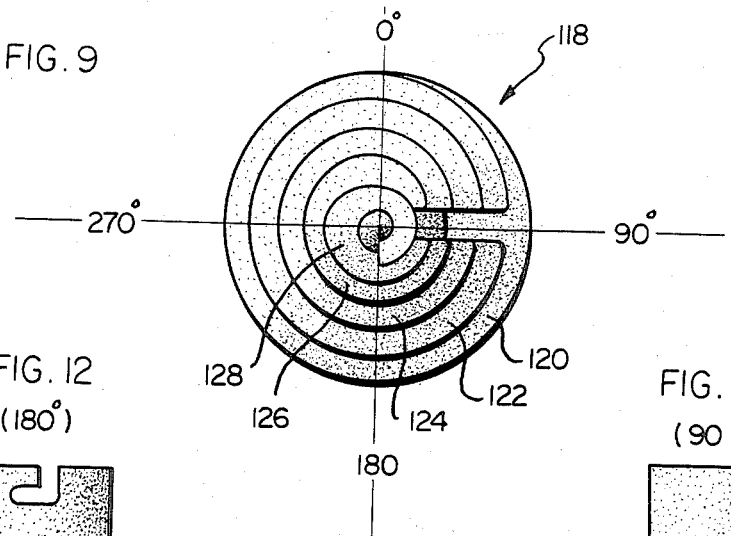
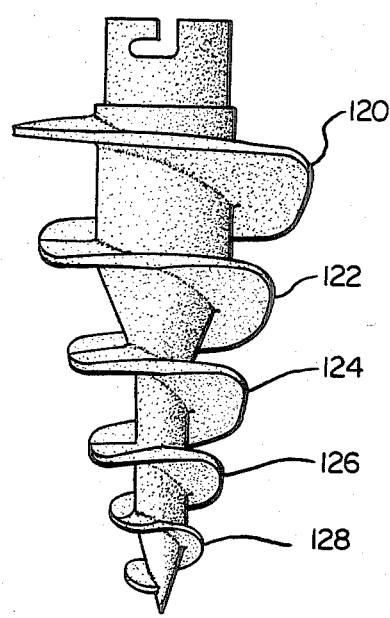
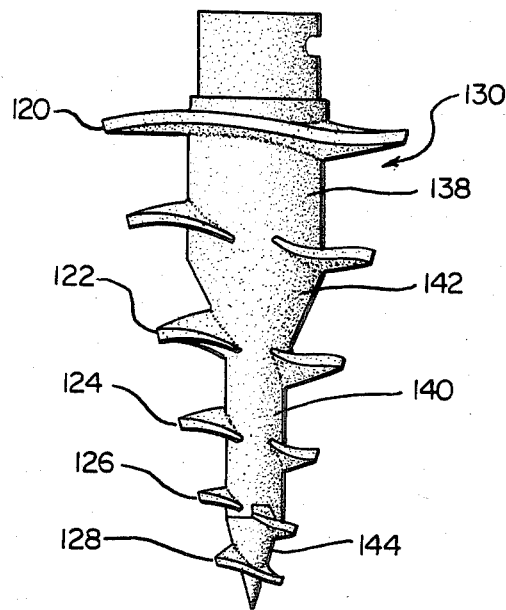
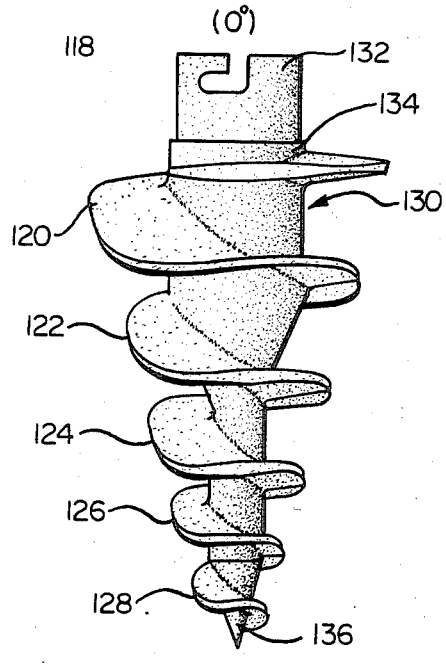
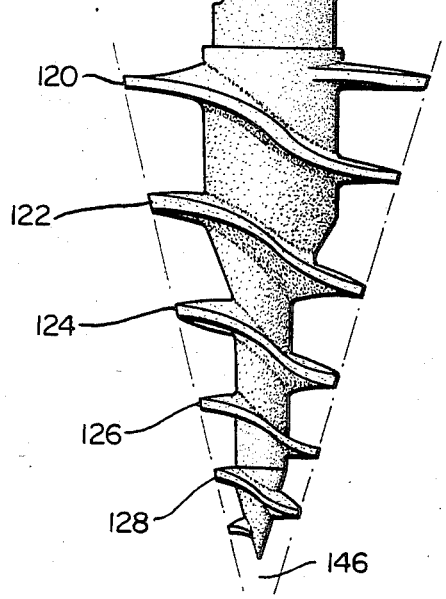

FROZEN DESSERT MIXER

BACKGROUND OF THE INVENTION

This is a continuation-in-part application of my co-pending U.S. application Ser. No. 569,475, now U.S. Pat. No. 4,548,508, filed Jan. 9, 1984, entitled Frozen Dessert Mixer.

The present invention relates generally to the art of mixing food products. More particularly, the present invention relates to the mixing of ice cream or ice milk with flavoring components in a machine having a vertically fixed, motor-driven, mixing auger and a vertically reciprocating mixing cone. The present invention seeks to provide an improved means for vertically driving the cone to engage the auger.

Additionally, the present invention seeks to provide improved means for providing convenient access to the mixing cone for loading the frozen commestibles while also securely locking the mixing cone during the mixing operation. Also, the present invention further seeks to provide an improved auger design for mixing and extruding the frozen dessert product.

It has long been desired to effectively mix ice cream and flavors in a palatable, easily served condition. In this respect a hard flavoring substance is frequently mixed in with softer ice cream, alternatively a soft flavoring substance may be mixed in with the ice cream. But, consumer desires are not limited to simply mixing ice cream and the various flavoring products. From an economical point of view it is desirable to mix ice milk to produce various flavors. Likewise, other frozen desserts could be mixed in a machine utilizing the present invention. For convenience sake, this wide range of possible mixing substances will be referred to throughout the present application as ice cream, although it is not intended that the scope of the present invention by limited to uses involving ice cream solely; the spirit of the invention should be construed to include machines used to mix ice milk or other frozen desserts also.

The technology for effectively accomplishing the mixing of such products as ice cream or ice milk with flavoring products such as chocolate cookies has long been known. The most successful of the known devices for accomplishing the mixing, C. Reed, U.S. Pat. No. 2,626,132, uses an auger shaped mixing device and a cone shaped mixing container. Using this combination, it is possible to mix the ice cream and the flavoring substance into a softer, flavored product which can be extruded from the bottom of the cone into a dish or an ice cream cone. The present invention is directed towards a device or mechanism for bringing the mixing container, preferably an extruding cone, into engagement with the mixing auger.

The prior art has provided a number of methods for accomplishing this result. The most common of these devices, e.g. Ehrenfeld, U.S. Pat. No. 1,982,339; Stroud, U.S. Pat. No. 1,993,024; and, Carnahan, U.S. Pat. No. 2,110,498 utilize a dually groved shaft which is spun by the motor. The mixing container then rides up and down this shaft due to the spiral groving in the shaft itself. This is an automatic arrangement typically activated by a switch sensitive to the mixing container being vertically aligned with the mixing blades.

Another method which has been used to bring the mixing blades into contact with the mixing container is described in U.S. Pat. No. 3,352,543, Niederman et al., and involves the interconnection of a worm gear with a rack gear, one being fixed to the system housing and the other being fixed to the rotating shaft for the mixing blades. In this type of configuration the mixing blades may be driven vertically as the shaft rotates in a normal mixing operation. This is similar to the above described scheme in that the vertical reciprocation of the mixing container or blades is accomplished automatically when the mixing blades are rotated by the system motor.

However, it is not always desired that the system operate automatically. In fact, there are some applications of these mixing machines, such as home use, which seem to dictate manual operation.

The prior art also contains a teaching of the use of a manually operable lever for raising the mixing container into engagement with the mixing element. The most comprehensive teaching of this scheme is found in C. A. Reed, U.S. Pat. No. 3,061,279. This patent describes a method and mechanism for raising the mixing container by use of various cable and pulley connections. Through a chain and sprocket interconnection, the movement of the lever causes a cable to wind around a decreasing radius drum thereby raising the mixing container. The reverse causes the container to be lowered. In this situation, the most power and the least vertical speed is found at the end of the stroke when the auger is deeply engaged in the food product.

An earlier patent, C. A. Reed, U.S. Pat. No. 2,626,133, likewise teaches the use of a manually operable lever arm to cause the mixing container to engage the mixing auger. This patent uses a simple lever operation which may be fully depressed without immediately forcing the container to the top of the its vertical stroke; a spring biasing arrangement is set when the lever is pulled and the force of the spring replaces that of the operator to finish the vertical movement of the container.

However, much of the prior art has been directed primarily towards commercial applications of such devices. It is now desirable to produce a device which will allow the mixing of ice cream and flavors such as bananas, peanut brittle, or blue berries in the home. In this respect, the prior art is not acceptable and its teachings are deficient; the relative size and strength of force necessary to operate any of the prior art devices makes them impractical as a household product. For example, the lever action described above requires an undue amount of force to be applied to the lever to actuate the vertical movement of the mixing container. While this is acceptable in a commercial setting, it is impractical for operation on a kitchen counter in the home where the typical user is a housewife or child. Also, the devices currently available are quite heavy, some in the neighborhood of 250 lbs. Such a large weight keeps these machines from being acceptable in the home where counter-top mobility is desired and a fixed, permanent location for the machine is unlikely.

In the home it is desired to have a mixing device which is relatively easy to use and of predominantly simple construction. Also, such a machine should be light weight, durable, and easily cleaned. It is also desirable that the product made for home use provide a sure feel to the user, require only a relatively light force to operate, and yet provide a steady flow of extruded product.

Therefore, it is the primary object of this invention to provide a forzen dessert mixer for use in the home which is capable of mixing ice cream and flavoring products. It will be appreciated then that a further object of the invention is to provide for the relatively easy vertical drive of a mixing container into engagement with a mixing element.

It is also an object of the present invention that the operation of the device not require undue strength or exertion by the operator.

It is a further object of the present invention to provide for the extrusion of a steady stream of mixed product.

It is still a further object of the present invention to provide for steady, true vertical movement of the mixing container without substantial binding on internal guides.

An additional object of the present invention is to provide an improved device for selectively attaching the mixing cone to a driving mechanism of the mixing machine to allow for easy filling of the cone while ensuring secure and desirably stable positioning of the cone during the mixing operation.

A further additional object of the present invention is to provide an improved mixing auger for mixing and extruding the frozen dessert product.

BRIEF DESCRIPTION OF THE FIGURES

The features of the present invention which are believed to be novel are set forth with particularity in the appended claims. The invention, together with its objects and the advantages thereof, may best be understood by reference to the following detailed description taken in conjunction with the accompanying drawings of which:

FIG. 2 is a rear view of the preferred embodiment of the present invention also showing the view lines for FIGS. 3 and FIG. 4;

FIG. 3 is a cross-sectional view of the preferred embodiment of the present invention;

FIG. 9 is a bottom view of a preferred embodiment of on improved mixing auger of the present invention;

FIG. 10 is a side view of the improved mixing auger of FIG. 9 from the zero degree line illustrated in FIG. 9;

FIG. 11 is a side view of the improved mixing auger of FIG. 9 from the 90° view line illustrated in FIG. 9;

FIG. 12 is a side view of the improved mixing auger of FIG. 9 from the 180° view line illustrated in FIG. 9; and FIG. 13 is a side view of the improved mixing auger of FIG. 9 from the 270° view line illustrated in FIG. 9.

DESCRIPTION OF THE PREFERRED EMBODIMENT

In particular, the present invention is concerned with a frozen dessert mixer which can mix ice cream with any number of flavoring products such as fruit or candy and is primarily directed towards an improved means for vertically driving a mixing container to engage a mixing auger. The vertical drive gear train of the preferred embodiment of the present invention allows for the mixing and smooth extrusion of ice cream, or other food product, and a flavoring product through a true and precise vertical movement of the mixing container to engage the mixing auger. This may be accomplished utilizing the preferred embodiment as pictured in the three dimensional isometric illustration of FIG. 1.

Figure 1:
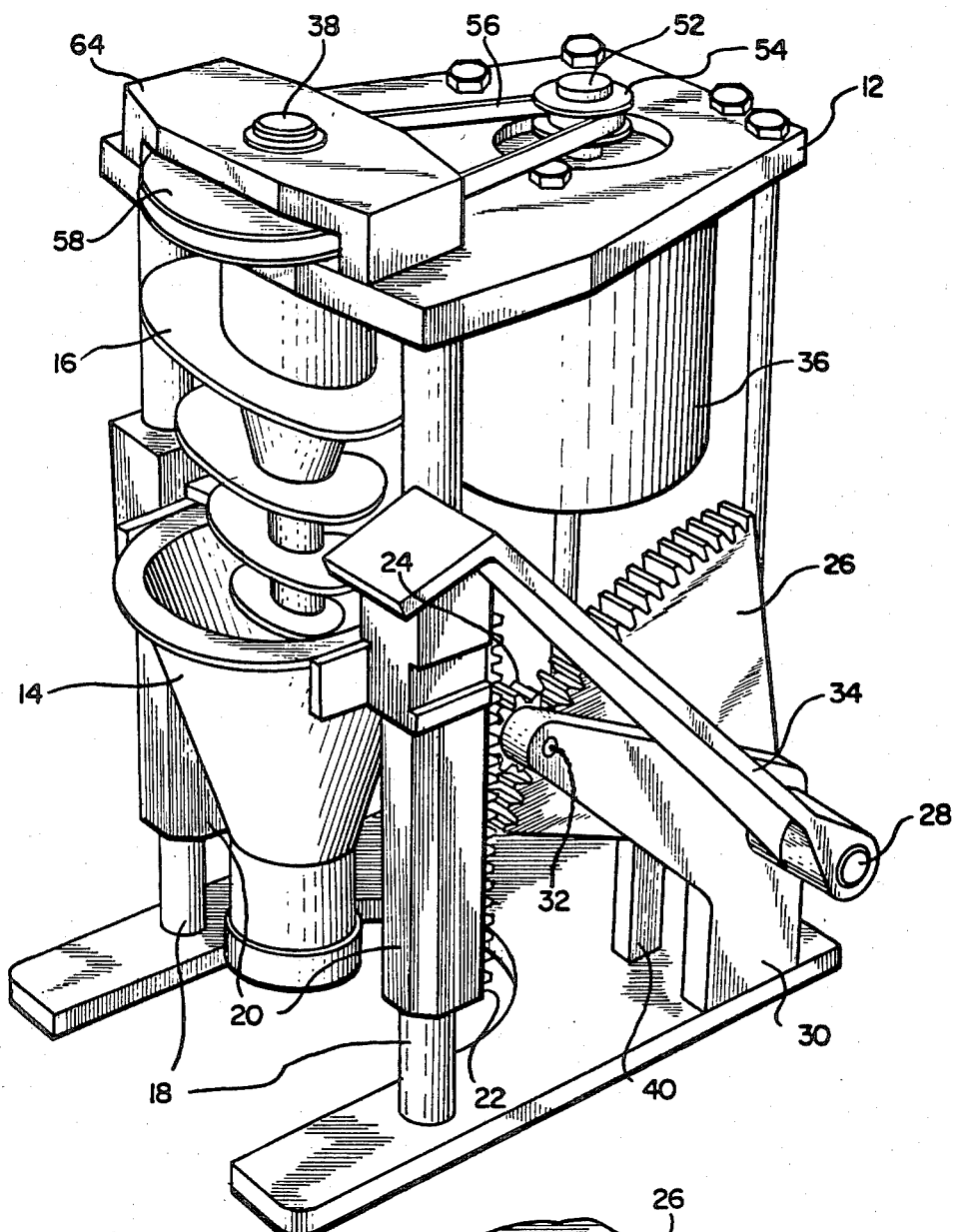
FIG. 1 is a isometric representation of a preferred embodiment of the present invention.

FIG. 1 shows a frozen dessert mixer having a base 10, a top 12, and a food product mixing cone 14 vertically aligned with a mixing auger 16. In operation, mixing cone 14 is moved vertically along vertical guides 18 until the food product in the mixing cone 14 is engaged by the vertically fixed mixing auger 16. Mixing cone 14 is attached to vertical guides 18 by a cone support structure 20 which is mounted so as to slide vertically upon the vertical guides 18. Attached to cone support sfructure 20 are rack gears 22 and 22' (not shown) which are intermeshed with a pinion gear 24 which is then correspondingly intermeshed with an arc gear 26. Arc gear 26 is fixedly mounted on a shaft 28 which is supported in bearings 30 and 30' (FIGS. 2 and 3) mounted on base 10. Likewise, pinion gear 24 is rotatably mounted on a shaft 32 which is also supported by bearing 30. Lever arm 34 is also fixedly mounted upon shaft 28 upon which arc gear 26 is mounted.

In operation of the vertical drive function, lever arm 34 is pulled forward and down in a counterclockwise direction which causes shaft 28 also to turn in a counter-clockwise direction thereby causing arc gear 26 to rotate in a counter-clockwise direction. This causes pinion gear 24 to rotate on shaft 32 in bearing 30 thus raising support 20 by action of pinion gear 24 on rack gear 22. This effectively raises mixing cone 14 to engage mixing auger 16 as cone support structure 20 slides up the vertical guides 18.

Figure 4:
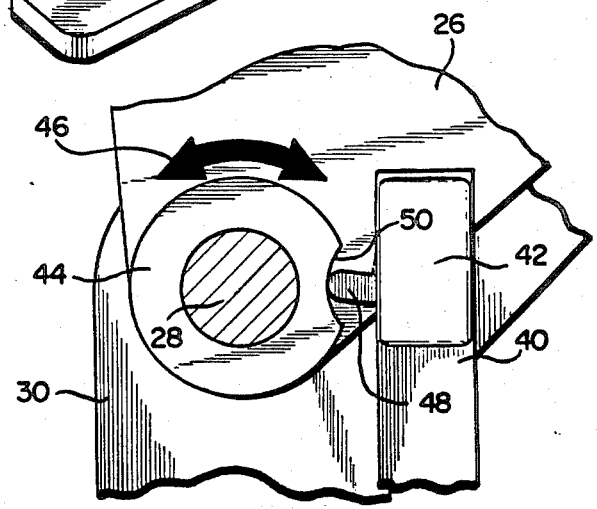
FIG. 4 is a cross-sectional view of the switch which activates the motor in response to motion of the lever.

Once mixing cone 14 sufficiently engages mixing auger 16, it is desired that a motor 36 be activated to drive a shaft 38 on which mixing auger 16 is mounted. This is accomplished through the use of a limit switch 42 (not shown in FIG. 1) which is mounted on column 40. As the arc gear 26 is moved through a predetermined angle, a cam mounted thereon allows limit switch 42 to turn on, thus activating motor 36. This is shown in FIG. 4 as limit switch 42 mounted on column 40. A cam 44 is shown mounted on the rear of arc gear 26 with its direction of motion indicated by arrow 46. As arc gear 26 is rotated, can 44 shifts around in either a clockwise or counter-clockwise direction with arc gear 26 on shaft 28 which allows an activating element 48 of limit switch 42 to follow the edge of cam 44 out of indent 50. The corresponding movement of element 48 actuates limit switch 42 thus turning on motor 36.

When motor 36 is activated, it rotates a shaft 52 and a capstain 54 to cause a belt 56 to turn, thus transferring the energy of motor 36 to a capstain 58 mounted on shaft 38 which turns auger 16 as cone 14 engages the auger. When the lever 34 is returned to its initial position, cam 44 mounted on the back side of arc gear 26 rotates back to its initial position which causes activating element 48 of limit switch 42 to resume its initial position in indent 50, thus turning off motor 36.

Referring now to FIG. 2, therein is shown a view from the rear of the preferred embodiment of the present invention showing mixing cone 14 in its fully descended, or loading, position and view lines for FIG. 3 and FIG. 4. FIG. 2 also illustrates the pairing of elements in the preferred embodiment. Shown are the two vertical support guides 18 and arc gears 26—26′. Both gears 26 and 26′ are fixedly mounted on shaft 28 at the same angle relative to lever 34. Also shown are bearings 30—30′ which support shaft 28 and are mounted on base 10. Pictured in the lower left hand corner of FIG. 2 is support column 40 upon which limit switch 42 (discussed above but not shown) is mounted.

When the machine of the preferred embodiment of the present invention is in the loading position as shown in FIG. 2, the various ingredients may be readily inserted without undue interference from the mixing auger. For example, vanilla ice cream or ice milk can be loaded into the cone along with the flavoring ingredient such as a chocolate cookie or two. To facilitate this loading operation, the preferred embodiment further provides that mixing cone 14 may slide in and out on support structure to provide ready access for the ingredients. Once mixing cone 14 is returned to its operational position, it may be engaged with mixing auger 16 as more fully described below to extrude a smooth, creamy, and deliciously blended product.

Referring now to FIG. 3, therein is shown a cross-sectional view of the preferred embodiment of the present invention. This is a view of the machine along the line 3—3 in FIG. 2. Specifically, FIG. 3 illustrates the desired vertical drive movement of the present invention and the corresponding elements of arc gear 26, pinion gear 24, and rack gear 22 of the novel drive mechanism as shown in FIG. 1. These include parallel mounted arc gear 26′ mounted on shaft 28 supported by bearings 30 and 30′. Similarly, parallel pinion gear 24′ is shown mounted on shaft 32′ and meshed with arc gear 26′ and rack gear 22′. Also shown in this side view is the rear of cone support structure 20 for mixing cone 14.

In operation, lever arm 34, not shown in FIG. 3, causes a counter-clockwise movement of arc gear 26′ about shaft 28. This produces a clockwise rotation of pinion gear 24′ about shaft 32′. Consequently, rack gear 22′ is driven in an upward direction due to the transfer of the force from lever arm 34 through arc gear 26 and pinion gear 22′. This causes mixing cone 14 to become operationally engaged with mixing auger 16. As mixing cone 14 proceeds towards its upper limit it defines the angular range of arc gear 26′, and the food product held by mixing cone 14 will be mixed and steadily extruded from extrusion hole 60 in the base of mixing cone 14 shown in FIG. 3.

Also shown in FIG. 3 is a mounting arrangement for mixing auger 16. Mixing auger 16 is mounted on shaft 28 by means of a spring friction connection 62. It will be appreciated that any number of methods may be used to attach the mixing auger to the rotating shaft; the method shown in thus given merely for illustrative purposes.

In the preferred embodiment, mixing auger 16 has a metal cutting tip 66 as shown in FIG. 3. This cutting tip 66 facilitates the processing and mixing of the various food products in mixing cone 14, especially harder ingredients such as peanut brittle and chocolate chip cookies.

Figure 5:
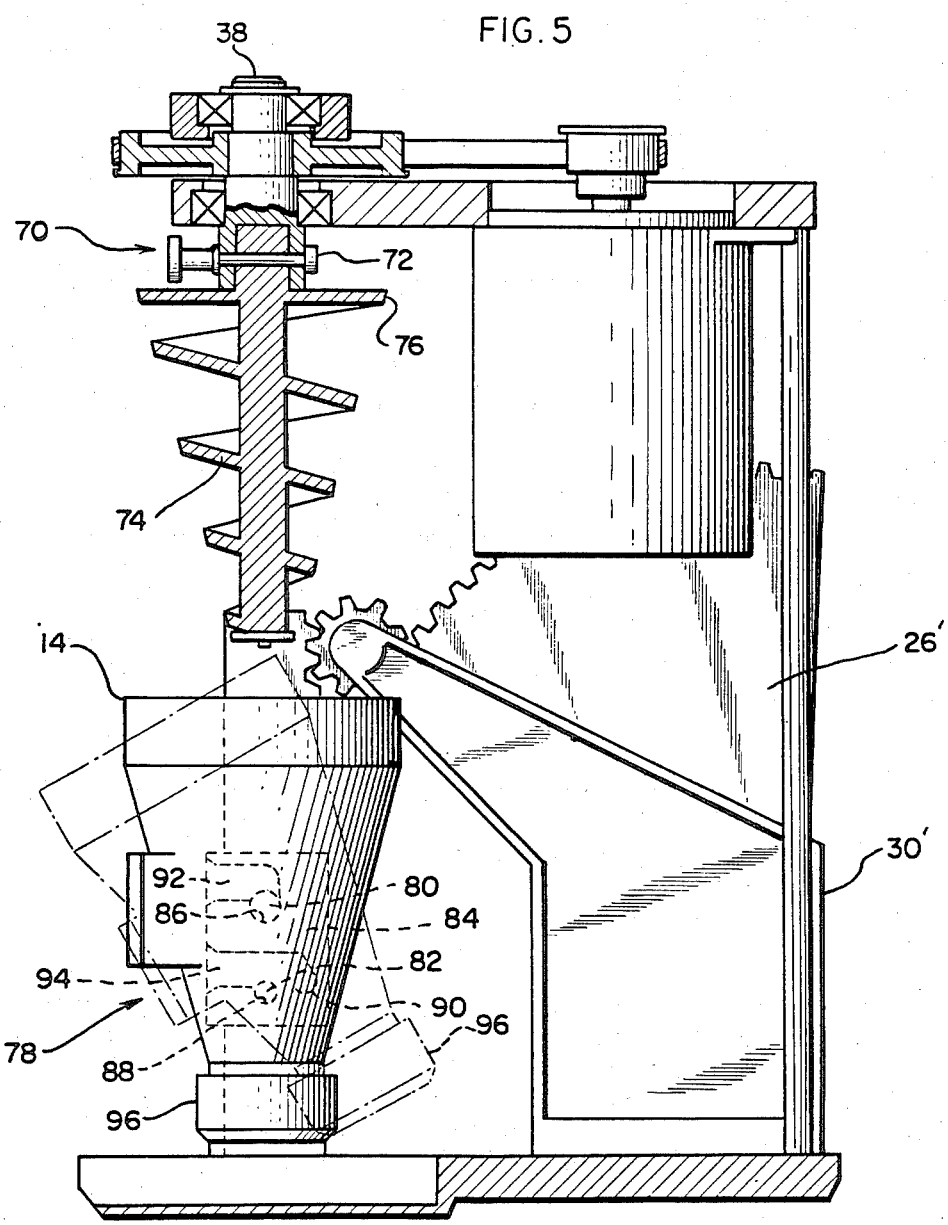
FIG. 5 is a cross-sectional view of a modification of th preferred embodiment of the present invention.
Figure 6:
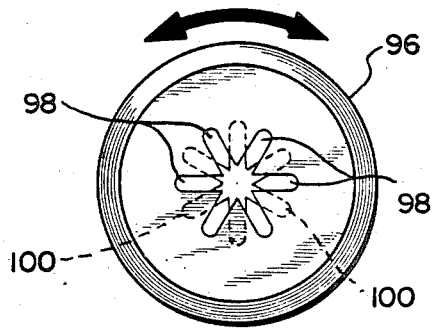
FIGS. 6 and 6A are views of the optional mixing cone controlled extrusion means in its partially closed and fully open positions, respectively.
Figure 6A:
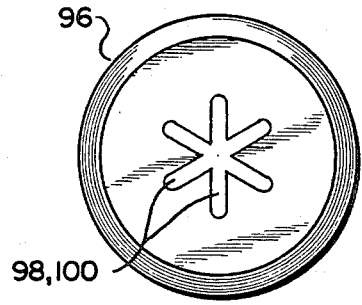

FIGS. 5, 6, and 6A serve to illustrate that the preferred embodiment of the present invention may be rearranged and new features added as convenience and necessity dictate. Particularly, FIG. 5, which is a view along the line 3—3 of FIG. 3, shows a modified configuration of the preferred embodiment in which the bearings 30 and 30′ have been located inside of the arc gears 26 and 26′. This may be done to provide for cross-bracing between the bearings to avoid undue flexing and binding during operation of the lever arm 34.

Also, in FIG. 5, an alternate auger-attaching mechanism 70 is shown for securing an auger to the shaft 38. Specifically, the auger-attaching mechanism 70 comprises a pin and locking device 72 which is securely fastened through the auger and the shaft 38 as shown.

Similarly, mixing auger 16 may be replaced with a slightly modified auger. In FIG. 5, mixing auger 16 has been replaced with a modified auger 74 having a sealing flange 76. Sealing flange 76 forms a solid, circular flange at the top of auger 74. The diameter of flange 76 is approximately equal to the inside diameter of the top of mixing cone 14. It will be appreciated that when mixing cone 14 reaches the top of a mixing stroke, flange 76 will interact with the top portion of mixing cone 14 to form a seal and prevent splashing and splattering of the mixed food product.

Mixing cone 14 may also be attached to vertical guides 18 by means other than the cone support structure 20 mentioned above. FIG. 5 illustrates an attaching means 78 consisting generally of guide pegs 80 and 82 and a supporting receptacle 84 (shown in dashed lines) which has been fixedly mounted on the rack gear 22′ on one vertical support guides 18. Guide pegs 80 and 82 are attached to mixing cone 14 and may be selectively aligned in indents 86, 88, and 90 of support receptacle 84. Thus, when guide peg 80 is in indent 86 and guide peg 82 is in indent 88, the mixing cone 14 may be vertically driven to engage the mixing auger. When guide peg 82 is adjusted to fit into indent 90, mixing cone 14 will be in a forward tilting, yet steady, position for easy loading of the ice cream and other goodies. Also, mixing cone 14 may be removed from the support structure for emptying or cleaning by withdrawing guide pegs 80 and 82 through channels 92 and 94, respectively. It will be appreciated that this is particularly advantageous when the mixed product in the cone is of a predominately liquid nature, explained in more detail below.

Figure 7:
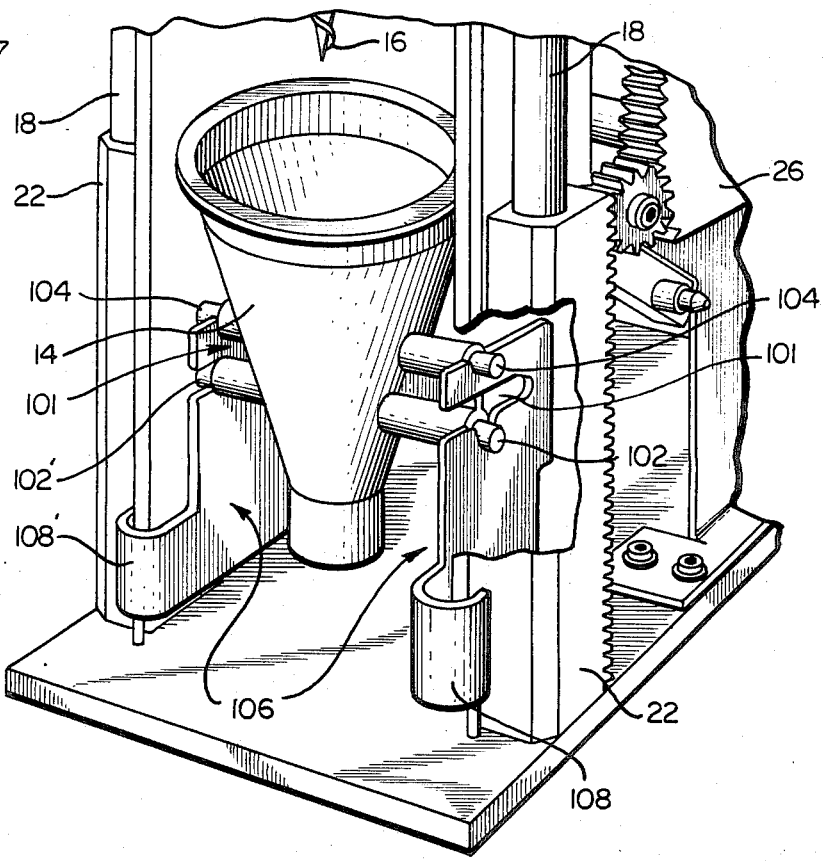
FIG. 7 is a partial cutaway, perspective view of a frozen dessert mixing machine showing improved means for providing stable, tiltable selected attachment of the mixing cone to the drive mechanism.

Another embodiment of the cone attachment mechanism according to the present invention is illustrated in FIG. 7. Therein is shown pivot means 101 which generally comprise paired mounting posts 102—102′ and 104—104′ secured to the mixing cone 14. Posts 102, 102′, 104 and 104′ generally cooperate with position locking means 106, which further comprises frame members 108 and 108′ secured to the drive mechanism of the frozen dessert mixing machine. Frame member 108 and 108′ are attached to rack gears 22 so as to move up and down along vertical guides 18 upon actuation of the drive mechanism of the frozen dessert mixer as described above.

Figure 8:
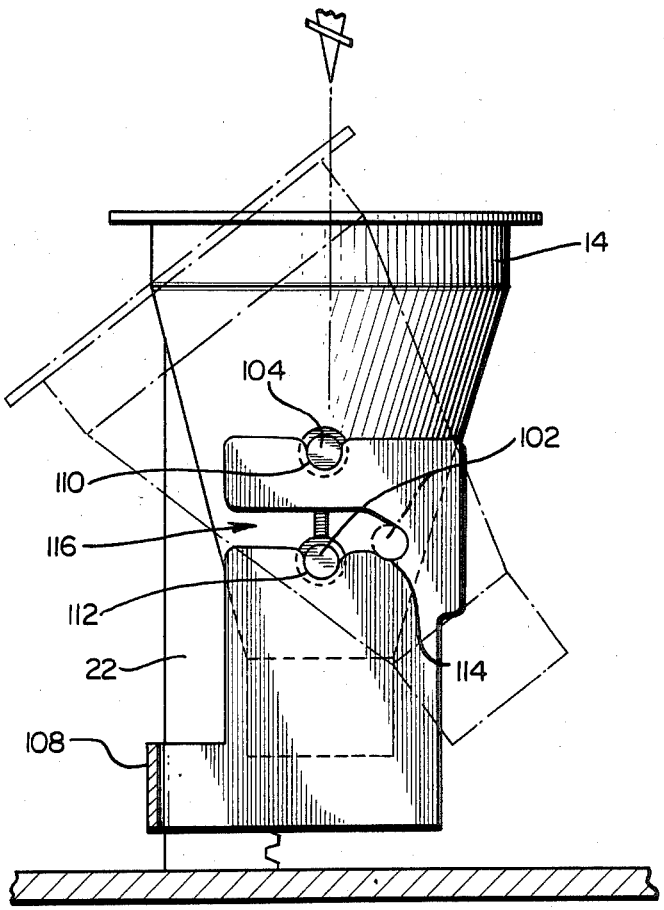
FIG. 8 is a cutaway side view of the frozen dessert mixer of FIG. 7 showing the improved cone attachment means and two selectable positions of the cone.

This embodiment of the present invention may be further understood by reference to FIG. 8. Therein is shown a partial cutaway side view of the mixing cone with the tilting feature provided. More particularly, one of paired mounting posts 104—104′ rests in an indent (or notched section) 110, which is defined in frame 108. Correspondingly, one of paired mounting posts 102—102′ rests securely in indent 112 which is also defined in frame 108. As both of paired mounting posts 104—104' and 102—102' are mounted along a vertical center line of mixing cone 14, and in the preferred embodiment indent 110 and 112 are vertically aligned, the mixing cone is held securely in a vertically upright position for the mixing operation. This orientation and use of the indents to secure the horizontal stability of the mixing cone is preferable during the mixing operation which tends to vibrate the mixing cone. The downward pressure of the auger on the mixing cone the accommodation of mounting post 104 in indent 110 and guide post 102 in indent 112, sufficient to keep mixing cone 14 stable during the mixing operation.

An additional indent 114 is provided along a radius from indent 110 and also is defined in frame 108. Indent 114 is spaced from indent 110 equal to the predetermined spacing between guide post 104 and 102. Accordingly, mixing cone 14 may be tilted at the desired angle defined by the location of indent 114 to allow ready filling of the mixing cone 14. In this fashion, the mixing cone is securely positioned during both filling and mixing.

Definition of indent 110 in the top of frame member 108 and the addition of passageway 116 in frame 108 provides for selective attachment of mixing cone 14. In this fashion, mixing cone 14 may be readily removed for cleaning or to pour the mixed product when desired.

The pivot means, such as mounting posts 102—102', 104 and 104' may be molded integrally with mixing cone 14 as a unitary construction, preferably of readily changeable, sanitary plastic. The position locking means such as frame members 108 and 108' may likewise be integrally molded with rack gears 22 and preferably formed of the same plastic material.

It will appreciated by those skilled in the art that the pivot means of the embodiment illustrated in FIGS. 7 and 8 is substantially shown in FIG. 5 by the dashed lines and described above. The embodiment of FIGS. 7 and 8 utilizes an elongated frame members 108 and 108', while removing an overlap in the frame over indent 86 as shown in FIG. 5.

Frequently, it is desired to mix ice cream or other products, including milk, with flavoring substances to produce a mixed product such as a milk shake which may be predominately liquid in nature. At such times, it may be more desirable to pour the mixed product into a serving container, rather than extruding it through the base of mixing cone 14. In order to facilitate this, mixing cone 14 may be fitted with controlled extrusion means 96 as shown in FIG. 5.

Controlled extrusion means 96 is shown in more detail in FIGS. 6 and 6A. These figures illustrate that in the preferred embodiment controlled extrusion means 96 is variably openable. Specifically, FIG. 6 shows controlled extrusion means 96 in a predominately closed position in which extrusion openings 98 and inside openings 100 do not overlap except in the very center. It will be appreciated by those skilled in the art that configuration could be used which would allow controlled extrusion means to be fully closed, e.g., nonoverlapping slots or holes. Thus, mixing cone 14 may also be used to pour the mixed product into a serving container.

FIG. 6A shows the maximally open position for controlled extrusion means 96 as extrusion openings 98 coincide exactly with inside openings 100. In this position, the mixed product will be extruded from the base of mixing cone 14.

It will be appreciated that there are any number of variations in the degree of overlap between the illustrated extremes of FIG. 6 (no overlap) and FIG. 6A (total overlap). It will also be appreciated that the openings in controlled extrusion means 98 may be any other suitable shape, e.g. circular, rather than being slots in a star shape as illustrated in FIGS. 6 and 6A. Additionally, it will be appreciated that the variability introduced by sealing cap 96 may be used to vary the rate of extrusion from mixing cone 14 and thereby the degree of product mixing within the mixing cone before extrusion. Also, there is no need for a special attachment when liquid refreshments are to be mixed in the present invention; a simple turn of controlled extrusion means 96 converts mixing cone 14 into a handy pouring container.

Referring now to FIGS. 9 through 13, therein is shown another embodiment of the mixing auger for use in the frozen dessert mixer according to the present invention. Improved auger 118 generally is illustrated in FIG. 9 as a bottom view showing the generally circular sections 120, 122, 124, 126 and 128 of the auger scroll. These sections together define a generally spiral, decreasing diameter configuration from the top portion of the auger 118 to the tip. The improved design of auger 118 may be more fully understood by reference to the accompanying side views of FIGS. 10 through 13 which represent side views from 0°, 90°, 180°, and 270°, respectively, according to the orientation shown in FIG. 9.

As shown in FIG. 10, the auger 118 generally comprises an auger body 130 having a series of scroll sections attached thereto. The auger body includes a mounting bracket 132 which is attached to a base portion 134 of auger body 130 and is preferably integral therewith. The scroll section extends along the length of the auger body to the tip portion 136. More particularly, as shown in FIG. 11, the auger body 130 may be broken down into a first generally cylindrical portion 138 and a second generally cylindrical portion 140. These two portions are joined by a first tapered portion 142 and the auger body then terminates at a second tapered portion 144 which generally defines the tip of the auger.

As seen in FIG. 10, the scroll of the auger is generally defines a series of horizontal planes along the 0° view line. As seen in FIG. 11, the scroll sections generally define series of planes included approximately 30° to the horizontal. As further illustrated in FIG. 12, the scroll sections again define a series of planes approximately horizontal along the auger body. Finally as shown in FIG. 13, the scroll sections generally define a series of planes approximately 35° inclined to the horizontal. Overall, the combination of the scroll sections generally define a modified spiral cantilevered outward from the auger body. As shown in FIG. 13, the included angle defined by the outside edges of the decreasing diameter scroll sections, shown as angle 146, approximately equals the inside included angle of the mixing cone 14. This is desirable to create a complete extrusion action once the auger is fully immersed into the desired frozen dessert product contained in the mixing cone.

Referring again to FIG. 11, therein is shown a series of interruptions in the overall spiraling of the auger scroll, thus defining the separate scroll sections 120, 122, 124, 126, and 128. The interruptions create glitches in the generally spiral design of the scroll as open spacing between the scroll sections. The placement of the interruptions in the scroll design of the auger to create the individual scroll sections facilitates the mixing of the frozen food product. In conjunction with the contour of the scroll and the auger body, the interruptions in the scroll pattern allow for a churning action to develop in the frozen product during mixing to create a more thoroughly mixed product and a more consistent extrudate.

Preferably, the improved auger may be injection molded from suitable plastic materials. Although one piece construction may be generally desirable tip portion 144 of the auger may be formed as a separate metal portion to facilitate mixing and reduce wear of the auger. Likewise, mounting bracket 132 for attaching the auger to auger rotation mechanism may be formed of metal to reduce wear and provide a true and secure lot.

The first screw section 120 of the improved auger may be seen from the illustrations of FIGS. 10 through 13 to comprise a substantially horizontal flange about the base portion of the improved auger 118. This flange-like action of the first scroll section is designed to generally prevent splashing of the mixing product during mixing.

While the operation of the present invention has been described above, it will also be appreciated that the construction of the present invention allows for the easy operation described. Specifically, the gears, lever, and support bearings may be made of hard durable plastic thus saving weight and cost in construction and manufacture. Also, auger 16 and mixing cone 14 may be made of a similar product to facilitate both ease of handling and cleaning as in the preferred embodiment of the present invention. This allows for a light weight (less than twenty pounds), easily movable structure.

Additionally, the gearing arrangement of arc gear 26, pinion gear 24, and rack gear 22 of the invention provides sufficient leverage so as to allow operation of the machine by its intended users, typically housewives and children. This arrangement in fact provides better leverage with a short arm (approximately twice the radius of the arc gear) than is typically available in prior art devices. This, coupled with the compact size of the machine embodying the present invention (as more fully discussed below), allows for convenient use in the home either on a counter top or some other location.

Similarly, the mounting arrangement of motor 36, corresponding capstains 54 and 58, drive belt 56, and bearing 64 allows for adequate product mixing yet still provides a dramatic height and bulk reduction in comparison to prior art designs. In the preferred embodiment of the present invention, the height is only slightly more than 15 inches compared to some prior art devices which are as tall as 43 inches. The novel gearing arrangement as described above also contributes to this dramatic reduction in height by replacing prior art designs utilizing levers, pulleys, springs, chains, and cables with the above described, side mounted gear drive.

The preferred embodiment of the present invention also utilizes two vertical guides 18 for the mixing cone 14 to slide upon. Likewise, two drive trains embodying the novel gear drive including arc gears (26—26'), pinion gears (24—24'), and rack gears (20—20') are provided. Through this arrangement, binding on the vertical guides is virtually eliminated during the vertical movement of mixing container 14. Also, this gives the user a solid feel during operation of the lever arm and avoids undue stress on the machine components. Likewise, because there are no binding forces to be overcome, lever arm 34 need not be as long as would otherwise be necessary.

It will be appreciated from the above description of the operation and construction that the user may directly vary the speed at which the mixed food product, e.g. flavored ice cream, is extruded through opening 60 by changing the speed at which lever arm 34 is operated. Likewise, the user may reverse the direction of movement of container cone 16 at any time during its vertical stroke by merely moving lever arm 34 in the opposite direction. Additionally, the gearing arrangement of the present invention as described above allows the user to accomodate the physical characteristics of the food products to be mixed. For example, if it is desired to mix a hard flavoring substance such as chocolate chip cookies with frozen ice cream, the user may pull the lever arm down fairly slowly to insure that the cookies are adequately chopped-up and mixed with the ice cream. Alternatively, if it is desired that a chunky texture product be extruded, the user may pull the lever arm to its limit more quickly. In the same fashion, it will be appreciated that the mixture of softer flavoring agents such as fresh bananas or boysenberries would allow for faster operation of the lever arm and still produce an essentially creamy effluent.

During home use, it is envisioned that the operator, perhaps a housewife or child, would begin with the mixing cone 14 in its loading position as shown in FIG. 2. In this position the operator would then scoop in ice cream, ice milk, or other frozen dessert product and add the desired flavoring product such as chocolate chip cookies, candy mints, or even blueberries. Once the mixing cone is fully loaded, the operator pulls the lever arm 34 toward herself, thus causing the mixing cone 14 to rise along the vertical guides 18 and turn on the motor as more fully described above. As the cone is raised, the operator may use her other hand to insert a dish or ice cream cone under the extrusion opening 60 in the base of mixing cone 14. As the mixing cone 14 is raised still further, the products in the cone become thoroughly mixed due to the action of auger 16 and a smooth, creamy and delicious effluent is forced from extrusion opening 60 into the ice cream cone or dish which was placed below it. When mixing cone 14 reaches the upper limit of its vertical stroke, the mixing cone 14 should be empty due to the extruding properties of the cone and auger configuration. At that point, the dish or cone containing the delicious mixed product is removed and mixing cone 14 is returned to the loading position by the operator pushing lever arm 34 away from herself.

It will be appreciated that the novel gear drive of the present invention allows for the simple one-handed operation described through its increased leverage and precise movements. further, the flexibility in the speed with which the mixing cone 14 is raised helps to prevent premature extrusion of the mixed product, for example, if the mixing process is not complete or a smoother texture is desired. This overcomes one of the disadvantages of the prior art which made no such provision.

Thus, the present invention embodied in the novel gear train described above allows enjoyment in the home of freshly mixed ice cream (or other food products). The ice cream machine utilizing the present invention is of a relatively compact size and is light enough to be moved easily. More importantly, it can be easily operated by its intended users and does not require undue strength to do so. Additionally, it is of simple and durable construction.

Conveniently, the preferred embodiment designed to facilitate easy cleaning of the machine in home use allows mixing cone 14 to be removed from support structure 20 for cleaning or other purposes. Likewise, mixing auger 16 may be made detachable from shaft 38. Additionally, a detachable spill tray may be provided below mixing cone 14 to catch spill or overflows.

The preferred embodiment of the present invention may also include a housing for the machine embodying the novel gear train. Specifically, a removable hood may be placed over the machine to prevent unwanted splattering in the kitchen. In such a system, the limit switch 42 may be set so that the mixing auger 16 will only be driven by motor 36 when the top of mixing cone 14 is raised up under the hood. It will be appreciated that this also offers a safety factor to the machine operation because the hands and fingers of the operator cannot become entangled in the mixing auger while it is turning as it operates only when safely enclosed behind the hood. another safety feature may also be incorporated into the preferred embodiment by including a safety switch which prevents operation of the motor when the hood is removed for cleaning.

As mentioned above, the use of the term ice cream throughout the application was intended for illustrative purposes and in no way limits the scope of the present invention. Also, it will be appreciated that the present invention may be used in environments other than those particularly set out herein. The exact nature and scope of the present invention is set out in the appended claims and is not meant to be limited to the particular preferred embodiment shown. Modifications and alterations as would be apparent to one skilled in the art and familiar with the teachings of this application are intended to be within the spirit of the present invention.

What is claimed is:

1. In a frozen dessert mixing machine generally having a mixing cone, a mixing auger and a drive mechanism for driving said cone and auger into operational engagement, improved means for selectively attaching said mixing cone to said drive mechanism comprising:
   pivot means secured to said mixing cone; and
   position locking means secured to said drive mechanism and adapted to accommodate said pivot means to lock said cone in selected positions and adapted to maintain said cone in alignment with said auger in at least one of said positions.

2. The improved attachment means of claim 1 wherein said pivot means comprises:
   first and second pairs of mounting posts each mounting post of a pair being secured to opposite sides of said mixing cone; and
   said first and second pairs being vertically aligned with each other and secured at a selected spacing apart along a centerline of said cone.

3. The improved attachment means of claim 2 wherein said position locking means comprises:
   paired frame members secured to said drive mechanism;
   a pair of first notched sections defined in each of said frame members and adapted to removably receive and accommodate said first pair of mounting posts; and
   a set of second notched sections defined in each of said frame members, disposed along radii from said first notched sections at said selected spacing and adapted to removably and accommodate receive said second pair of mounting posts,
   wherein at least one of said set of second notched sections in each frame member is vertically aligned with said first notched section in said frame members.

4. A frozen dessert mixing machine comprising:
   a base having at least two vertical guides;
   a vertically stationary, rotating mixing auger;
   a removable cone shaped mixing container having a reduced extrusion opening and paired, generally opposing mounting means;
   mixer power means for rotating said auger;
   means for driving said mixing container into operational alignment with said mixing auger including paired vertically slidable drive mechanisms mounted on said vertical guides; and
   frame means secured to each of said slidable drive mechanism and adapted to recieve said paired, generally opposing mounting means,
   each of said frame means including position locking means for locking said mixing container in at least two discrete orientations, a first of said orientations being at a selected angle to the vertical to accommodate filling said container and a second of said orientations being generally vertically upright to facilitate vertical drivement of said container into operational alignment with said mixing auger.

5. The frozen dessert mixer of claim 4 wherein said paired, generally opposing mounting means comprises:
   a first pair of mounting posts secured to said mixing container along a center line extending outwardly from said mixing container opposite one another; and
   a second pair of mounting posts secured to said mixing container along a center line and extending outwardly from said mixing container opposite one another, said second pair being secured to said mixing container in vertical alignment with said first pair at a selected spacing 6. The frozen dessert mixer of claim 5 wherein each position locking means comprises:
   a first notch in said frame adapted to accommodate one of said first pair of mounting posts;
   a second notch in said frame at said selected spacing from said first notch adapted to accommodate one of said second pair of mounting posts in said first of said orientations; and
   a third notch in said frame at said selected spacing from said first notch adapted to accommodate one of said second pair of mounting posts in said second of said orientations.

* * * * *